United States Patent [19]

Spedding

[11] Patent Number: 4,997,257

[45] Date of Patent: Mar. 5, 1991

[54] OPTICAL CABLE

[76] Inventor: Stephen T. Spedding, 13, Lealholme Avenue, Aspull, Wigan, WN2 1EH, England

[21] Appl. No.: 506,805

[22] Filed: Apr. 10, 1990

[30] Foreign Application Priority Data

Apr. 14, 1989 [GB] United Kingdom ............... 8908446

[51] Int. Cl.$^5$ .............................................. G02B 6/44
[52] U.S. Cl. ................................................ 350/96.23
[58] Field of Search ..................................... 350/96.23

[56] References Cited

U.S. PATENT DOCUMENTS 4,802,732  2/1989  Fukuma et al. ................ 350/96.23
4,820,014  4/1989  Nishimura et al. ............. 350/96.23
4,826,279  5/1989  Nishimura et al. ............. 350/96.23

FOREIGN PATENT DOCUMENTS 21965  5/1983  Australia .

Primary Examiner—William L. Sikes
Assistant Examiner—Robert E. Wise
Attorney, Agent, or Firm—Oliff & Berridge

[57] ABSTRACT

In a slotted core optical cable in which each slot contains stacked optical fiber ribbons, the cost of the cable can be reduced and cooling of the slotted core during manufacture of the cable is facilitated as compared with an optical cable in which the slots of the slotted core are all of the same depth by forming the circumferentially spaced slots into two groups, the slots of each group being of the same depth as one another and the depth of each of the slots of one group being greater than the depth of each of the slots of the other group, and by arranging for each slot of one group to be disposed between two slots of the other group. The number of optical fiber ribbons 5 stacked in each of the deeper slots is greater than the number of optical fiber ribbons stacked in each of the other slots. Approximately the same number of optical fiber ribbons can be accommodated in slots of a core of smaller diameter than hitherto achieved.

8 Claims, 1 Drawing Sheet

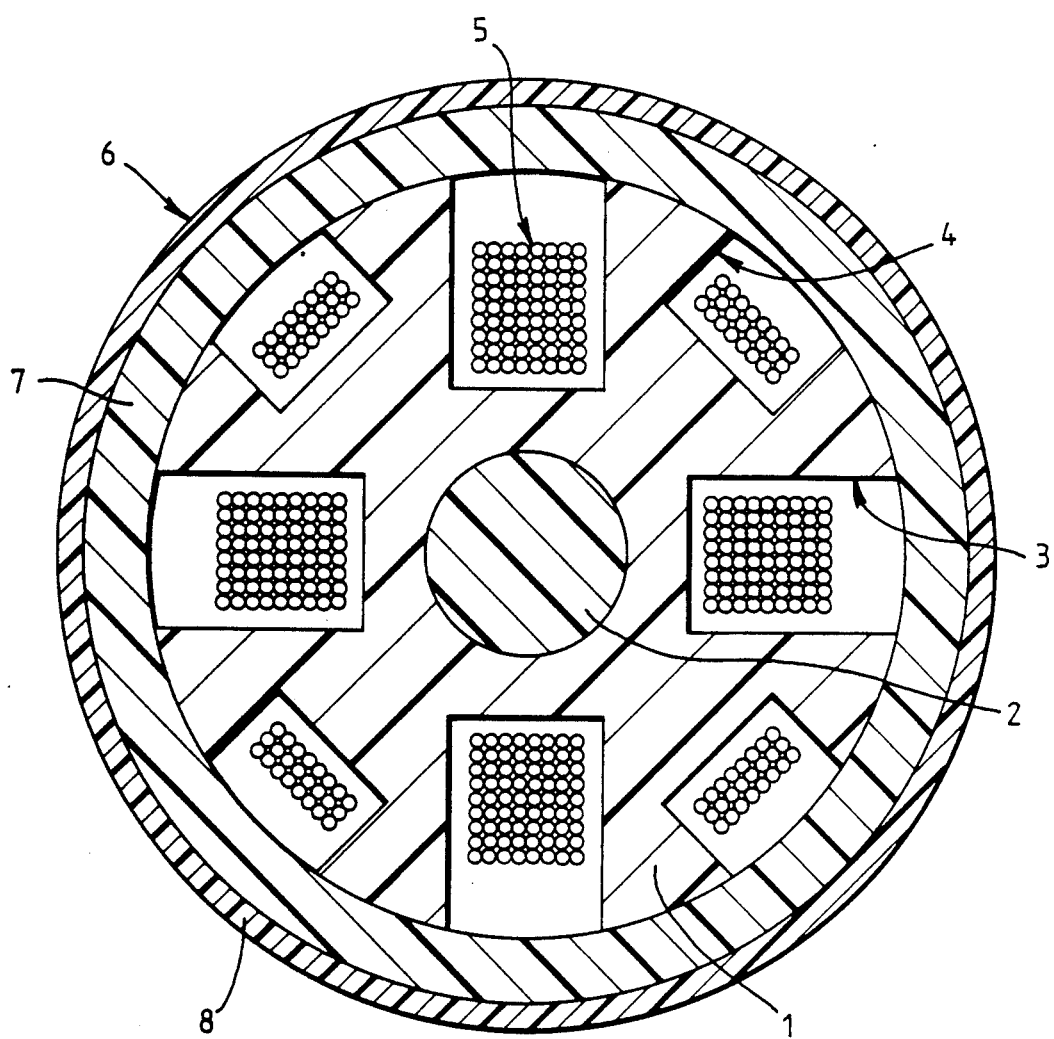

OPTICAL CABLE

This invention relates to optical cables of the kind comprising a central flexible elongate member of plastics material having in its outer surface a plurality of circumferentially spaced slots which extend lengthwise of the member and in at least some of which is housed at least one optical fibre and, surrounding the member, an overall outer protective sheath. Usually, but not necessarily, the circumferentially spaced slots follow helical paths around the longitudinal axis of the central member.

As optical communications systems have become more widely used, the number of optical fibres required in an optical cable of the aforesaid kind has increased very substantially and it is now not unusual for a need for an optical cable of the aforesaid kind incorporating several hundred optical fibres. To this end, an optical cable of the aforesaid kind has been proposed and used in which each slot is of substantially uniform width throughout its depth and is so disposed within the central member that a plane substantially midway between and parallel to the side walls of the slot extends substantially radially of the longitudinal axis of the central member and in which a plurality of optical fibre ribbons, each comprising a plurality of optical fibres disposed side by side with their axes lying in a substantially common plane, are stacked on one top of another in each of the circumferentially spaced slots. By way of example, an optical cable of the aforesaid kind currently available has in each of five circumferentially spaced slots in its central member, ten optical fibre ribbons stacked one on top of another, each of which ribbons includes eight optical fibres, so that the optical cable incorporates four hundred optical fibres.

Whilst, from the point of view of an optical communications system in which an optical cable of the aforesaid kind incorporating a multiplicity of optical fibres is to be used, optical cables of the aforesaid kind hitherto proposed and used have proved to be wholly satisfactory, such optical cables have disadvantages which render the cables costly to manufacture.

We have found that where each of a plurality of slots in the central member of an optical cable of the aforesaid kind is to house a plurality of optical fibre ribbons, the cross-sectional area of the central member required to accommodate these slots must be such that manufacture of the optical cable becomes undesirably expensive because of the large quantity of plastics material required to form the central member and because of the difficulty of efficiently cooling the large mass of plastics material, after the central member with the circumferentially spaced slots in its outer surface has been extruded and before the optical fibre ribbons are introduced into the slots, without distortion of the central member occurring. In practice, we have found there is an upper limit of the diameter of the central member above which it is not possible to cool the extruded central member without distortion of the central member taking place.

It is an object of the present invention to provide an improved optical cable of the aforesaid kind which is of such a construction that the disadvantages hereinbefore described are substantially reduced.

According to the invention the improved optical cable of the aforesaid kind has a central flexible elongate member of plastics material having in its outer surface a plurality of circumferentially spaced slots which extend lengthwise of the member, each of which slots is of substantially uniform width throughout its depth and is so disposed within the central member that a plane substantially midway between and parallel to the side walls of the slot extends substantially radially of the longitudinal axis of the central member, wherein the circumferentially spaced slots comprise two groups of slots, the slots of each group being of substantially the same depth as one another and the depth of each of the slots of one group being substantially greater than the depth of each of the slots of the other group and each slot of one of said groups being disposed between two slots of the other of said groups, and wherein each of said slots has a plurality of optical fibre ribbons stacked one on top of another in the slot, the number of optical fibre ribbons in each of the slots of greater depth being substantially greater than the number of optical fibre ribbons in each of the slots of smaller depth.

By virtue of this construction, the improved optical cable having a multiplicity of optical fibres approximating in number to an optical cable of the aforesaid kind hitherto proposed and used will have a diameter and weight per unit length which are substantially less than said known optical cable. As a consequence of the reduction in diameter of the central member - and hence in the mass per unit length of the plastics material of the central member - cooling of the extruded central member can be readily effected without distortion of the central member occurring.

Preferably, the depth of the slots of greater depth is approximately twice that of the slots of smaller depth.

As in optical cables of the aforesaid kind hitherto proposed and used, preferably each of the circumferentially spaced slots follows a helical path around the longitudinal axis of the central member.

Preferably, also, the central member has encapsulated within the plastics material of the member a central flexible elongate reinforcing element of a metallic or non-metallic material of high tensile strength. Where the central flexible elongate reinforcing element is of metal or metal alloy, preferably it is of steel; where it is of a non-metal, preferably it is of an aromatic polyamide. The central flexible elongate reinforcing element may be a single elongate element or it may be a plurality of elongate elements stranded or otherwise assembled together.

The central member may be surrounded by a single overall outer protective sheath, preferably of plastics material, but, in some circumstances, the overall protective sheath may be of composite form comprising an inner sheath of polyethylene or other plastics material and an oversheath of termite-resistant or flame-retardant material. A circumferentially continuous moisture barrier of metal or metal alloy may underlie the overall protective sheath.

The invention is further illustrated by a description, by way of example, a preferred optical cable of the aforesaid kind with reference to the accompanying drawing which shows a transverse cross-sectional view of the preferred cable drawn on an enlarged scale.

Referring to the drawing, the preferred optical cable comprises a central flexible elongate member 1 of plastics material in which is embedded a central flexible elongate reinforcing element 2 of an aromatic polyamide. The central flexible plastics member 1 has in its outer surface a plurality of circumferentially spaced slots which follow helical paths around the longitudinal axis of the central member and which comprise one group of four slots 3 of the same cross-sectional shape and size as one another and one group of four slots 4 of the same cross-sectional shape and size as one another. The slots 3 and 4 are of the same uniform width throughout their depth and are so disposed within the central member 1 that a plane midway between and parallel to the side walls of each slot extends radially of the longitudinal axis of the central member. Each of the slots 3 has a depth which is approximately twice that of each of the slots 4. As will be seen on referring to the drawing, each slot 3 is disposed between two slots 4. Each slot 3 has nine optical fibre ribbons 5 stacked one on top of another in the slot, each of the ribbons consisting of eight optical fibres. Each slot 4 has three optical fibre ribbons 5 stacked one on top of another in the slot. As a consequence, the preferred optical cable incorporates 384 optical fibres. The central member 1 is surrounded by an overall outer protective sheath 6 of composite form comprising an inner sheath 7 of polyethylene and an outer sheath 8 of flame-retardant material.

By way of comparison with the known optical cable hereinbefore described incorporating 400 optical fibres, the preferred optical cable illustrated in the accompanying drawing has a central member of a diameter which is approximately 93.6% of that of the central member of the known cable and a cross-sectional area which is approximately 87.6% of that of the central member of the known optical cable and the preferred optical cable has a cable weight per unit length which is approximately 92% of that of the known optical cable and a strength/weight ratio which is approximately 109% of that of the known cable.

It will be appreciated that, as a consequence of the reduction in cable diameter and cable weight per unit length as compared with those of a known optical cable having a multiplicity of optical fibres approximating in number to those of the improved optical cable, a substantial reduction in cost of the cable is achieved and, during manufacture of the improved optical cable, cooling of the central member emerging from the extruder can be more easily effected and more precisely controlled.

What I claim as my invention is:

1. An optical cable comprising a central flexible elongate member of plastics material having in its outer surface a plurality of circumferentially spaced slots which extend lengthwise of the member, each of which slots is of substantially uniform width throughout its depth and is so disposed within the central member that a plane substantially midway between and parallel to the side walls of the slot extends substantially radially of the longitudinal axis of the central member, a plurality of optical fibre ribbons stacked one on top of another in at least some of the slots and, surrounding the central member, an overall outer protective sheath, wherein the circumferentially spaced slots comprise two groups of slots, the slots of each group being of substantially the same depth as one another and the depth of each of the slots of one group being substantially greater than the depth of each of the slots of the other group and each slot of one of said groups being disposed between two slots of the other of said groups, and wherein each of said slots has a plurality of optical fibre ribbons stacked one on top of another in the slot, the number of optical fibre ribbons in each of the slots of greater depth being substantially greater than the number of optical fibre ribbons in each of the slots of smaller depth.

2. An optical cable as claimed in claim 1, wherein the depth of the slots of greater depth is approximately twice that of the slots of smaller depth.

3. An optical cable as claimed in claim 1, wherein each of the circumferentially spaced slots follows a helical path around the longitudinal axis of the central member.

4. An optical cable as claimed in claim 1, wherein the central member has encapsulated within the plastics material of the member a central flexible elongate reinforcing element of a material of high tensile strength.

5. An optical cable as claimed in claim 4, wherein the central flexible elongate reinforcing element is of an aromatic polyamide.

6. An optical cable as claimed in claim 4, wherein the central flexible elongate reinforcing element comprises a plurality of elongate elements assembled together.

7. An optical cable as claimed in claim 1, wherein the overall outer protective sheath is of composite form comprising an inner sheath of plastics material and an oversheath.

8. An optical cable as claimed in claim 1, wherein a circumferentially continuous moisture barrier of metal or metal alloy underlies the overall protective sheath.

* * * * *